Sept. 5, 1939.    R. C. ZEIDLER    2,172,077
CLUTCH CONTROL
Filed Jan. 31, 1938    3 Sheets-Sheet 1

INVENTOR.
Reinold C. Zeidler
BY
Barnes, Kuelle, Laughlin & Raisch
ATTORNEY.

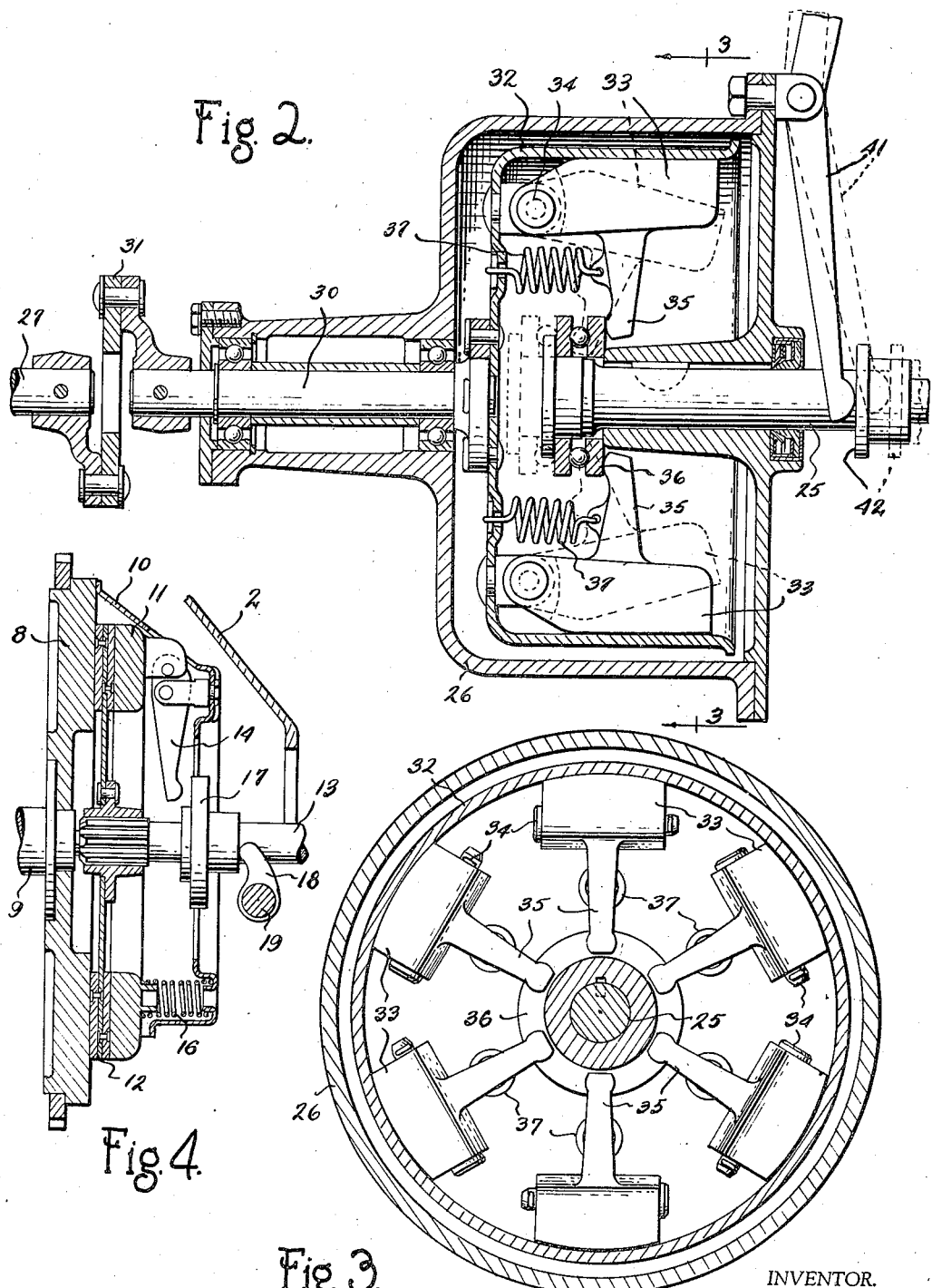

Sept. 5, 1939.  R. C. ZEIDLER  2,172,077
CLUTCH CONTROL
Filed Jan. 31, 1938   3 Sheets-Sheet 3
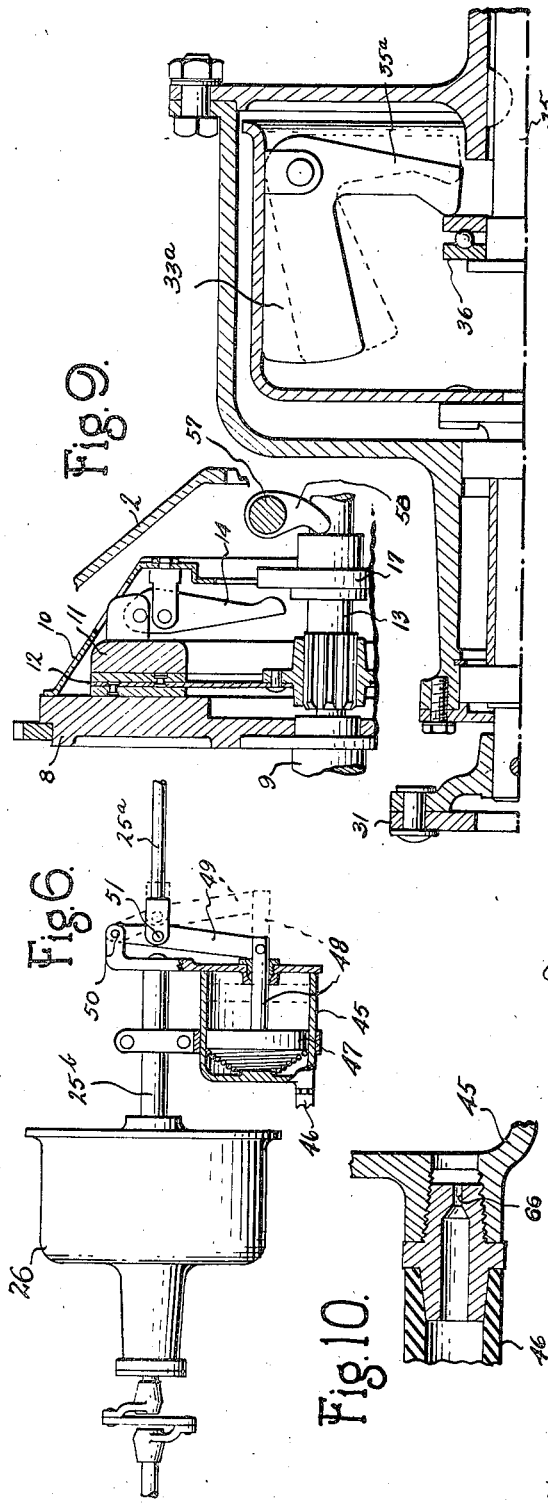
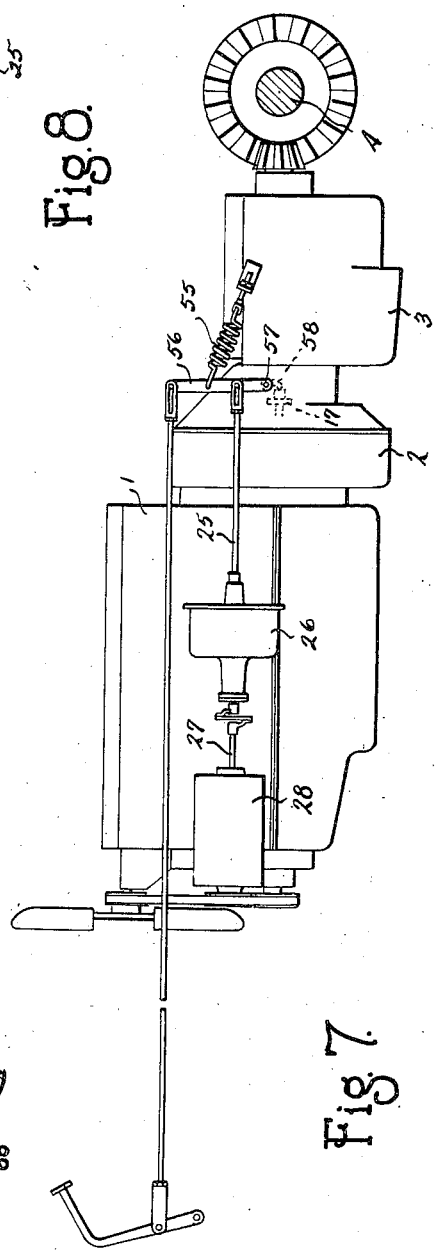
INVENTOR.
Reinhold C. Zeidler
BY Barnes, Kisselle, Laughlin & Raisch
ATTORNEYS Patented Sept. 5, 1939

2,172,077

UNITED STATES PATENT OFFICE 2,172,077

CLUTCH CONTROL

Reinhold Carl Zeidler, Detroit, Mich., assignor to Borg-Warner Corporation, Chicago, Ill., a corporation of Illinois Application January 31, 1938, Serial No. 187,849

18 Claims. (Cl. 192—103)

This invention relates to a clutch control, and has to do particularly with the controlling of a clutch associated with an internal combustion engine, especially in automotive vehicles.

The invention is directed particularly toward the provision of an automatically acting apparatus by means of which clutch engagement is controlled. Manually controlled clutches are subject to extreme abuse by different operators, some of whom are careless and negligent. One operator may run the engine slowly while the cutch is gently engaged; another may run the engine at excessive speeds while slowly engaging the clutch, thus generating high heat. Continued operation under the latter condition tends to break down the clutch.

In many commercial vehicles, such as buses, the engine and clutch are mounted at the rear while the operator is at the front. The operator cannot hear the engine very well, particularly when the bus is crowded, and to prevent the possibility of stalling the engine as the clutch is engaged, the operator often unnecessarily races the engine as the clutch is engaged. This sort of operation in commercial vehicles or passenger cars unnecessarily wears the facings and subjects the clutch to heat and tends to cause a breaking down of the clutch.

In accordance with the present invention a clutch is used which may be termed a conventional clutch in that it is normally engaged, either solely by springs or partially by springs and centrifugal force, or by spring means outside the clutch proper, and is of the type that is now manually controlled. By combining with such a clutch a controlling apparatus governed by the speed of rotation of the engine, an automatic clutch operation is obtained, although the clutch is not of an automatic type in itself. Moreover, other automatic actions in the clutch may be obtained although the clutch is of the so-called manual or conventional type.

In the accompanying drawings:

Fig. 2 is an enlarged cross sectional view taken through the centrifugal control unit.

Fig. 3 is a cross sectional view taken substantially on line 3—3 of Fig. 2.

Fig. 4 is a cross sectional view taken through a so-called manual or conventional clutch of the type which may be used with the invention.

Fig. 6 is a detailed view partly in section showing some of the construction in a modified form.

Fig. 7 is a general side view of an engine illustrating a further modified form.

Fig. 8 is a detailed section showing the interior of the centrifugal control element of the form illustrated in Fig. 7.

Fig. 9 is an enlarged view illustrating the clutch arrangement used with the modified form shown in Figs. 7 and 8.

Fig. 10 is a detailed sectional view of a vacuum line connection.

Figure 1:
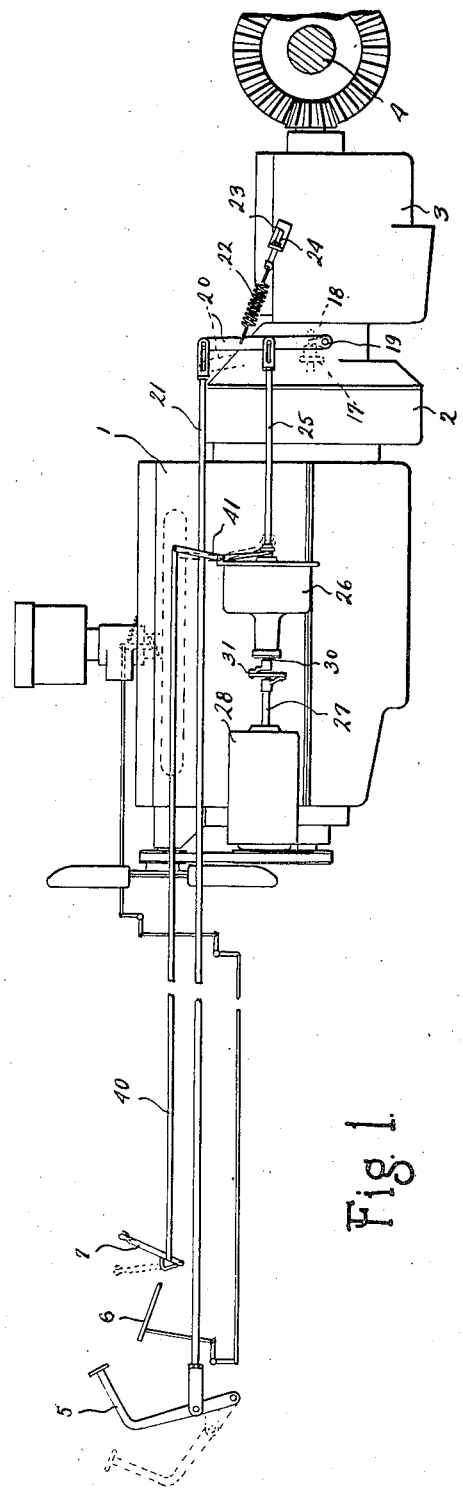
Fig. 1 is a general view illustrating an engine with a clutch housing and associated parts for mounting at the rear of a vehicle and showing the various controls.

An internal combustion engine is generally illustrated at 1, the same having a clutch housing 2, and being associated with a transmission 3 for driving an axle 4. This may be a rear engine mounting while the operator may sit at the forward end of the vehicle where the usual clutch lever 5 is mounted as well as other controls such as an accelerator 6 and a lever 7.

The clutch in the housing may have the elements as illustrated in Fig. 4, including a flywheel 8 mounted on the engine crank-shaft 9, a cover plate 10, a pressure plate 11, a driven disc 12 mounted upon a driven shaft 13. Clutch releasing levers 14 may be fulcrumed on the clutch cover plate 10 and connected to the pressure plate 11 and clutch packing springs are illustrated at 16. This clutch may be released in the usual manner by a clutch throw-out bearing 17 arranged to be actuated by a yoke 18 on a rocker shaft 19.

Secured to the rocker shaft 19 is an arm 20 with a pin and slot connection to a rod 21, in turn connected to the clutch pedal 5. A spring 22 may be connected to the arm 20 and to a fixed bracket 23 through the means of an adjustable screw threaded member 24. A rod 25 is connected to the arm 20 through the means of a lost play connection such as a pin and slot, and this rod extends into the centrifugal unit as illustrated in Fig. 2. The centrifugal unit comprises a housing 26 suitably mounted, as for example, on the side of the engine and said unit being driven by the engine, as for example, by an extended shaft 27 of a generator 28. This is only one way of driving the centrifugal unit. The driving shaft of the centrifugal unit is illustrated at 30, and it may have a universal joint connection 31 with the generator shaft. The shaft 30 is mounted in suitable bearings in the housing, and secured thereto is a drum 32. Mounted on this drum are a plurality of unbalanced centrifugal weight members 33 each pivotally mounted to a stud or bracket, as illustrated at 34, and each having an arm 35 arranged to function upon a shoulder or bearing 36 on the shaft 25. Spring means act upon the centrifugal weights and are illustrated herein as one coil spring 37 connected to each weight and to the drum 32. The lever 7 is operably connected with the control apparatus, as for example, through the means of a rod 40 connected to a lever 41, one end of which is arranged to function on an abutment or shoulder 42 on the shaft 25.

Before proceeding with the description of the modified forms it would seem to be well to go into the operation of the structure thus far described. The clutch springs 16 normally cause clutch engagement. However, the springs 37 are strong enough to pull the centrifugal weights to the dotted line position illustrated in Fig. 2; this causes shift of the rod 25 to the left as Figs. 1 and 2 are viewed, and the rod swings the arm 20 counter-clockwise and causes the yoke 18 to shift the clutch throw-out bearing 17 to the left, with the result that the clutch is disengaged. This disengaged condition maintains while the engine is operating at about idling speed or is at rest. In other words the springs 37 are strong enough to hold the clutch disengaged as well as to overcome centrifugal force at engine idling speed. The springs 37, as shown, operate through a considerable mechanical advantage due to the arrangement of the arm 20 and levers 14 and thus do not have to be as strong as the springs 16. When the engine is accelerated to an R. P. M. above idling speed the centrifugal weights 33 swing outwardly and ultimately stop against the drum 32. As the centrifugal weights swing outwardly the clutch packing springs 16 cause clutch engagement. This is permitted because the arms 35 of the weights have moved out of the way of the thrust bearing 36 and the shaft 25 is free to shift to the right, as Figs. 1 and 2 are viewed. When the engine is again decelerated to a point say just above idling speed, the springs 37 shift the weights inwardly and causes automatic clutch disengagement.

Should it be necessary or desirable at any time for the operator to manually disengage the clutch when it is otherwise engaged, the operator may press the pedal 5 and in turn rock the arm 20 counter-clockwise to cause clutch disengagement. The lever 20 may move independently of the rods 21 and 25, due to the lost play connections. At times it may be necessary to have the clutch engaged when the engine is not rotating. For example, it may be desirable to tow or push the vehicle to start the engine. To do this the operator actuates the lever 7 from the full line position shown in Fig. 1 to the dotted line position. This pulls on the rod 40, rocks the lever 41 from the full line position to the dotted line position shown in Fig. 2, and the lever 41 engages shoulder 42 and shifts the rod 25 to the right, extending the springs 37 and allowing the clutch springs 16 to engage the clutch. In normal operating condition, however, the lever 7 will be set so as to not interfere with the clutch, as for example, in the full line position shown in Fig. 1.

The spring 22 serves to hold back the lever 20 to keep the slack out of the lost play connections when the clutch is engaged, and this spring may also be used to balance the system. In other words the springs 37 and clutch springs 16 should best be fairly well balanced for proper operating condition, and this may be obtained by tightening or loosening the spring 22 through the adjustable connection 24.

Thus there is obtained an automatic clutch operation wherein the clutch automatically disengages as the engine approaches idling speed and automatically engages as the engine is accelerated above idling speed. Yet the clutch itself is of a conventional manually operated type and, therefore, does not need to be oversize or arranged to accommodate centrifugal weights and other mechanism. The centrifugal unit may not be particularly large in that it operates through a considerable mechanical advantage in releasing the springs of the clutch. The centrifugal unit, as illustrated herein, is not necessarily connected to rotate at the speed of the engine, it being desirable to have it connected to one of the accessories such as the generator which usually runs at from 1½ to 2 times engine speed. Since centrifugal force increases with the square of the R. P. M. adequate centrifugal force may be obtained in a relatively small unit and obviously the greater the ratio between R. P. M. of the unit and engine R. P. M. the smaller the unit may be.

Figure 5:
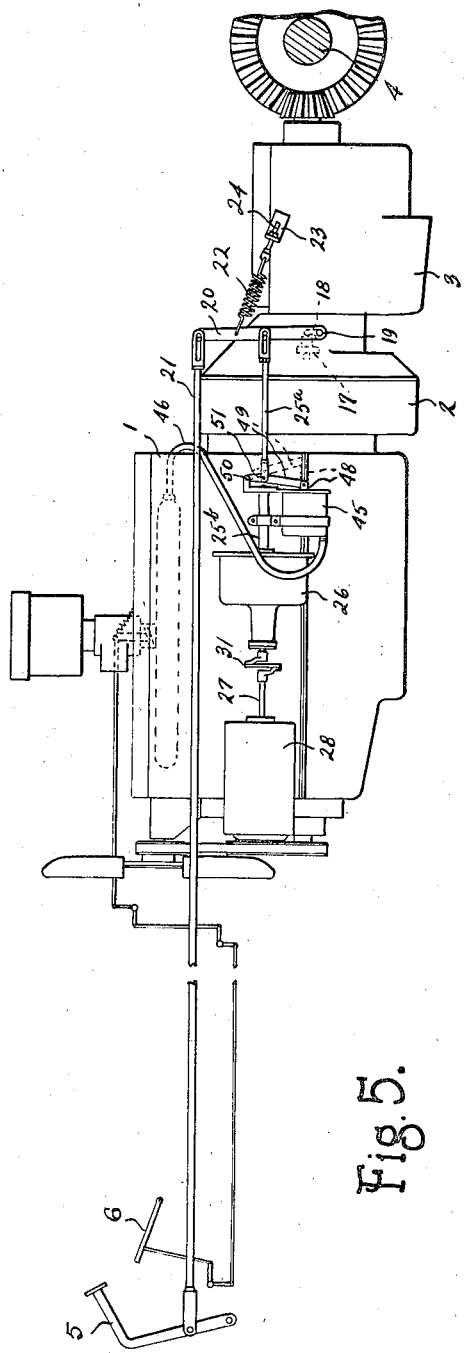
Fig. 5 is a general side view similar to Fig. 1 illustrating a modified form of the invention.

In the form shown in Figs. 5 and 6 the manually controlled lever arrangement 7 is dispensed with and an automatic control used instead. The other parts of the mechanism have the same reference characters as are used with the form shown in Fig. 1. In this form the rod 25 is divided into a section 25a and a section 25b. A vacuum motor 45 is mounted upon the section 25b to shift therewith, and it has a connection 46 to the intake manifold of the engine. A piston or diaphragm 47 of the vacuum motor has a piston rod 48 connected to an arm 49 pivoted at 50 to a bracket carried by the section 25b and also having a pivotal connection as at 51 with the section 25a. So long as the engine is operating with a relatively high vacuum in the manifold there is enough vacuum to cause the piston 47 to take the position shown in Fig. 6, thus, in effect, shortening the rod by bringing its sections 25a and 25b relatively close together. When the engine decelerates to idling speed the centrifugal controlling element, which is the same as that shown in Fig. 2, causes the rod 25a—25b to shift to the left, thus disengaging the clutch as above described. However, when the engine stops, the pressure in the manifold rises toward atmospheric pressure and therefore the piston 47 will shift to the right as Fig. 6 is viewed, and this will let the arm 20 rock clockwise to permit of clutch engagement. As soon as the engine is started, however, the piston 47 is again shifted to the left and the rod 25a—25b is shortened to its normal operating length so that the centrifugal control element operates in the above described manner.

This arrangement may also be used to effect a clutch engaging action under extreme conditions. Suppose, for example, that the engine is operating at relatively low R. P. M. and at high torque; such a condition would exist where the vehicle is on a long hard up-hill pull, and the R. P. M. of the engine is quite low but the torque is high. At this time the depression or vacuum in the manifold may approach atmospheric pressure due to the fact that the throttle is widely open, yet the engine is operating at a low R. P. M. The engine may decelerate to a point where the springs 37 would cause clutch disengagement, or tend to cause clutch disengagement. But at this time the vacuum in the manifold approaches atmospheric, with the result that the piston 47 shifts to the right, and therefore the springs 37 cannot disengage the clutch. Thus, although normally, the clutch disengages at engine idling speed, it will not disengage at this speed or at speeds approximating idling speeds where the engine is operating at high torque and low R. P. M.

The above described arrangement considers a connection between the vacuum motor or cylinder and intake manifold consisting of a pipe, hose, or similar air conveying means. And the above described conditions, that is, of the engine operating under high torque at low speeds producing close to atmospheric pressure or vacuum in the intake manifold, may be encountered when starting up in one of the low gears under a heavy load. This condition most generally exists for only a few seconds until the clutch takes hold and the engine regains its R. P. M. However, if the connecting air line between the vacuum motor and intake manifold be of large size then the instant the intake manifold vacuum reduces, the piston in the vacuum motor will move up and cause the clutch to engage too soon and possibly stalling the engine. To avoid this it is proposed to insert in the air line a restriction or orifice, as shown at 66 in Fig. 10, which will slow up the movement of air and cause the piston to move out more slowly. This rate of movement being governed by the amount of restriction.

A third modification is illustrated in Figs. 7, 8 and 9, and the difference here lies principally in the centrifugal control element. Those parts which are the same as the parts described in the above mentioned form carry the same reference characters. In this form the centrifugal weights 33a have arms 35a for acting upon the throw-out bearing 36 of the rod 25. In place of springs 37, however, one or more springs 55 may be secured to an arm 56 mounted on a clutch throw-out shaft 57 having a clutch throw-out fork 58. In this form the spring 55 normally tends to disengage the clutch because it swings the rocker shaft 57 clockwise which, through its yoke 58, will shift the clutch throw-out bearing to the left and actuate the clutch releasing levers. With the engine idling, the centrifugal weights assume the dotted line position shown in Fig. 9, and the clutch is then disengaged by the spring 55. Upon acceleration, however, the weights 33a swing to the full line position shown in Fig. 9, pull on the rod 25, and thus extend spring 55, and the clutch engages. In this form, however, during all normal operation of the engine there is a load on the shaft 25 and its bearing 36. Contrary to this, in the form of device shown in Fig. 2, there is no load on the rod 25 and its bearing 36 in normal operation. From this standpoint the Fig. 2 form may be preferred, since there is a load on the thrust bearing and associated parts only when the engine is idling and the clutch is released. In the form as in Figs. 7, 8 and 9 the spring 55 will be much stronger than the spring 22 shown in Fig. 1 because the spring 55 takes the place of and performs the clutch releasing function of the springs 37. The spring 22 may be relatively light, as it serves primarily as the balancing spring and a spring to take up slack in the lost play connections.

Therefore, it will be seen that an automatic clutch operation is obtained with a clutch construction of the so-called manual or conventional type. Any time the engine is accelerated and the clutch engaged the engagement takes place in a predetermined manner and corresponding to the speed of the engine. If the engine be mounted at the rear of the vehicle, the engine does not have to be raced to make sure that it will not be stalled; in fact, it will be impossible, as long as the transmission is in gear, to race the engine above the point, for example, 800 R. P. M., as this causes engagement of the clutch which loading the engine prevents it from racing. Thus, there should be a saving in the life of an engine since most engine life is relative to revolutions turned.

I claim:

1. The combination with a clutch having a rotary driving and a rotary driven member and having clutch spring means for packing the members into clutch engagement, of mechanical means overcoming the clutch spring means for holding the clutch disengaged at a substantially predetermined relatively low R. P. M., and a control unit separate from the clutch and connected to rotate with the driving member and having centrifugally acting weights operable to apply forces exerted centrifugally upon said mechanical means at an R. P. M. above said relatively low R. P. M. to resist the action of said means and render the same ineffective for overcoming the clutch spring means for automatic clutch engagement upon acceleration of the driving member above said relatively low R. P. M.

2. The combination with a clutch having a rotary driving member and a rotary driven member and having packing means for urging the members into clutch engagement, of mechanical means overcoming the packing means for holding the clutch disengaged at a substantially predetermined relatively low R. P. M., and when at rest, and a control unit separate from the clutch and connected to rotate with the driving member and having centrifugally acting weights operable to apply forces exerted centrifugally upon said means at an R. P. M. above said relatively low R. P. M. to resist the action of said means and render the same ineffective for overcoming the packing means for automatic clutch engagement upon acceleration of the driving member above said relatively low R. P. M.

3. The combination with a clutch having a rotary driving member and a rotary driven member and having packing means for urging the members into clutch engagement, of spring means located separately from the clutch for overcoming the packing means for holding the clutch disengaged at a substantially predetermined relatively low R. P. M., and a control unit connected to rotate with the driving member and having centrifugally acting weights operable upon said spring means at an R. P. M. above said relatively low R. P. M. to overcome the force delivered by said spring means and render said spring means ineffective for overcoming the packing means for automatic clutch engagement upon acceleration of the driving member above said relatively low R. P. M.

4. The combination with an engine, of a clutch having driving and driven members and packing means for packing the members into clutching engagement, spring means located exterior of the clutch having a strength for overcoming the clutch packing means and for holding the clutch disengaged at an idling R. P. M. of the engine, and means including centrifugally acting weights connected for rotation with the operation of the engine and operable at an R. P. M. of the engine above said idling R. P. M. to overcome the action of said spring means by centrifugal force for automatic clutch engagement upon acceleration of the engine above said idling R. P. M.

5. The combination with a clutch having driving and driven members and clutch packing means serving normally to engage the clutch, of means for effecting automatic clutch engagement and disengagement comprising, spring means for overcoming the clutch packing means for disengaging the clutch and holding it disengaged at a predetermined relatively low R. P. M. of the driving member, and means comprising centrifugal weights operable with rotation of the driving member for overcoming the action of the spring means by centrifugal force as the driving member is accelerated above said relatively low R. P. M. for automatic clutch engagement upon such acceleration.

6. The combination with a clutch having driving and driven members and clutch packing means serving normally to engage the clutch, a reciprocable rod outside the clutch and operably connected thereto, control means comprising centrifugal weights operable to rotate with the rotation of the clutch driving member, means operably associating the centrifugal weights with said reciprocable rod, spring means acting upon the weights and serving to shift the rod through the means of said weights and against the action of the clutch packing means to hold the clutch disengaged at a predetermined relatively low R. P. M., said centrifugal weights overcoming the action of the said spring means upon acceleration above said relative low R. P. M. for automatic clutch engagement.

7. The combination with an internal combustion engine, of a clutch having driving and driven members and clutch packing means normally serving to engage the clutch, a clutch control unit operably connected with the engine and having intermediate springs and centrifugal weights, said springs having a strength and being mechanically connected with the clutch to overcome the clutch packing means at engine idling speed to hold the clutch disengaged, said centrifugal weights serving to overcome the action of said springs upon acceleration above said idling speed for automatic clutch engagement.

8. The combination with an internal combustion engine, of a clutch having driving and driven members and clutch packing spring means normally serving to engage the clutch, a clutch control unit operably connected with the engine and having interconnected springs and centrifugal weights, said springs having a strength and being mechanically connected with the clutch to overcome the clutch packing spring means at engine idling speed to hold the clutch disengaged, said centrifugal weights serving to overcome the action of said springs upon acceleration above said idling speed for automatic clutch engagement, manually operable means connected to the clutch for effecting clutch disengagement at will while operating above said idling speed.

9. The combination with an engine, of a clutch having driving and driven members and clutch packing means normally serving to engage the clutch, spring means located outside the clutch for holding the clutch disengaged at and below engine idling speed, centrifugal means operably connected to rotate with the engine for overcoming the action of the spring means for automatic clutch engagement upon acceleration above said idling speed, and an additional spring means adjustable to substantially balance the relative condition of the clutch packing means and said spring means.

10. For use with an engine, a clutch having driving and driven members and clutch packing means serving normally to engage the clutch, a rocker arm operable for clutch engagement and disengagement, a control unit separate from the clutch and operably connected to the rocker arm and having springs for holding the clutch disengaged at engine idling speeds and when the engine is at rest, said control unit having centrifugal weights operable upon acceleration above engine idling speed to overcome the action of said springs by centrifugal force for automatic clutch engagement, and manually operable means connected to said arm for disengaging the clutch at will when operating above idling speed.

11. For use with an engine, a clutch having driving and driven members and clutch packing means serving normally to engage the clutch, a rocker arm operable for clutch engagement and disengagement, a control unit separate from the clutch and operably connected to the rocker arm and having springs for holding the clutch disengaged at engine idling speeds and when the engine is at rest, said control unit having centrifugal weights operable upon acceleration above engine idling speed to overcome the action of said springs for automatic clutch engagement, manually operable means connected to said arm for disengaging the clutch at will when operating above idling speed, and other manually operable means acting upon said spring means for engagement of the clutch at will when the engine is at rest.

12. The combination with an internal combustion engine, of a clutch having driving and driven members and clutch packing means serving normally to engage the clutch, clutch controlling means including spring means, and a connection between the spring means and the clutch for holding the clutch disengaged at engine idling speeds and including centrifugal weights operable to overcome the action of the spring means for automatic clutch engagement upon acceleration above engine idling speeds, said connection between the spring means and the clutch including articulating parts, and a vacuum motor pneumatically connected with the intake side of the engine and operable to render said connection ineffective when the engine is at rest whereby the spring means are in turn rendered ineffective and the clutch automatically engages as the engine comes to rest.

13. The combination with an internal combustion engine, of a clutch having driving and driven members and clutch packing means serving normally to engage the clutch, clutch controlling means including spring means, and a connection between the spring means and the clutch for holding the clutch disengaged at engine idling speeds and including centrifugal weights operable to overcome the action of the spring means for automatic clutch engagement upon acceleration above engine idling speeds, said connection between the spring means and the clutch including articulating parts, and a vacuum motor pneumatically connected with the intake side of the engine and operable to render said connection ineffective when the engine is at rest whereby the spring means are in turn rendered ineffective and the clutch automatically engages as the engine comes to rest, and manually operable means for controlling clutch engagement and disengagement at will when the engine is operating above idling speed.

14. In combination with an internal combustion engine, a normally engaged clutch, spring means outside the clutch having a strength sufficient for holding the clutch disengaged at idling speed of the engine and when the engine is at rest, centrifugal control means operable with the engine and separate from the clutch for overcoming the action of the spring means when the engine is accelerated above engine idling speeds, and a vacuum motor for controlling the action of the spring means to render the spring means ineffective when the engine is at rest whereby the clutch automatically engages as the engine comes to rest.

15. In combination with an internal combustion engine, a normally engaged clutch, automatically acting means outside the clutch for holding the clutch disengaged at idling speed of the engine and when the engine is at rest, centrifugal control means operable with the engine and separate from the clutch for overcoming the action of the automatic means when the engine is accelerated above engine idling speeds, and a vacuum motor for controlling the action of the automatic means to render the automatic means ineffective when the engine is at rest whereby the clutch automatically engages as the engine comes to rest.

16. The combination with a clutch having a driving member a driven member and clutch packing means for packing the members into clutch engagement, a rocker arm connected to the clutch for controlling clutch engagement and disengagement, spring means connected to the rocker arm and serving to hold the clutch disengaged at and below a predetermined relatively low R. P. M. of the driving member, and centrifugal weight means operably associated to rotate with the driving member and connected to said rocker arm for shifting the rocker arm against the action of the said spring means upon acceleration of the driving member above engine idling speeds for automatic clutch engagement.

17. In combination with an internal combustion engine, a normally engaged clutch, automatically acting means outside the clutch for holding the clutch disengaged at idling speed of the engine and when the engine is at rest, centrifugal control means operable with the engine and separate from the clutch for overcoming the action of the automatic means when the engine is accelerated above engine idling speeds, a vacuum motor for controlling the action of the automatic means, a vacuum line connecting the motor and the intake side of the engine, said vacuum motor being arranged to render the automatic means substantially ineffective when the pressure in the intake side of the engine approaches atmospheric, and restriction means in the connection between the vacuum motor and the intake side of the engine for delaying the action of the vacuum motor upon sudden increase of pressure in the intake side of the engine.

18. The combination with an engine, of a clutch having driving and driven members and clutch packing means normally serving to engage the clutch, spring means located outside the clutch for holding the clutch disengaged at and below engine idling speed, centrifugal means operably connected to rotate with the engine for overcoming the action of the spring means for automatic clutch engagement upon acceleration above said idling speed, and adjustable means which is adjustable to substantially balance the relative condition of the clutch packing means and the said spring means.

REINHOLD CARL ZEIDLER.